US012669109B2

(12) United States Patent
Javadian et al.

(10) Patent No.: US 12,669,109 B2
(45) Date of Patent: Jun. 30, 2026

(54) ANTI-OSCILLATION TOOL FOR WIND TURBINE BLADES

(71) Applicant: Vestas Wind Systems A/S, Aarhus N. (DK)

(72) Inventors: Payam Javadian, Aarhus N (DK); Balachandar Mahalingam, Coimbatore (IN); Dhineswaran Loganathan, Chennai (IN)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/689,903

(22) PCT Filed: Sep. 8, 2022

(86) PCT No.: PCT/DK2022/050185
§ 371 (c)(1),
(2) Date: Mar. 7, 2024

(87) PCT Pub. No.: WO2023/036391
PCT Pub. Date: Mar. 16, 2023

(65) Prior Publication Data
US 2024/0376860 A1     Nov. 14, 2024

(30) Foreign Application Priority Data

Sep. 8, 2021    (DK) ............................ PA 2021 70448

(51) Int. Cl.
*F03D 1/06*       (2006.01)
*F03D 80/00*      (2016.01)

(52) U.S. Cl.
CPC ............. *F03D 1/069* (2023.08); *F03D 80/00* (2016.05); *F05B 2240/211* (2013.01); *F05B 2260/96* (2013.01)

(58) Field of Classification Search
CPC .......... F03D 1/069; F03D 80/00; F03D 80/50; F03D 13/10; F05B 2240/211; F05B 2260/96; Y02E 10/72
See application file for complete search history.

(56) References Cited

U.S. PATENT DOCUMENTS 1,888,289 A * 11/1932 Raffles ................... B25H 3/006
                                                         224/232
5,146,684 A *  9/1992 Hagler ................. B26B 29/025
                                                          30/162

(Continued)

FOREIGN PATENT DOCUMENTS

CN        107972988 A  *  5/2018
DK        201870065 A1    12/2018

(Continued)

OTHER PUBLICATIONS

Danish Patent and Trademark Office, technical examination issued in corresponding DK Application No. PA 2021 70448, dated Jan. 28, 2022.

(Continued)

*Primary Examiner* — Nathaniel E Wiehe
*Assistant Examiner* — Wayne A Lambert
(74) *Attorney, Agent, or Firm* — Wood Herron & Evans LLP

(57)                ABSTRACT

A tool (14) for reducing vibrations in wind turbine blades at scheduled standstill for example during turbine installation or service, the tool comprising an elongate flexible sock-like sleeve (16) for fitting over the blades (10) having an airflow-disrupting function and a guard (24) of semi-rigid material provided at an edge of the sleeve which overlies the blade trailing edge into which are received aerodynamic enhancing features such as serrations (20).

32 Claims, 9 Drawing Sheets

(56)　　　　　　　References Cited

U.S. PATENT DOCUMENTS

| | | | | |
|---|---|---|---|---|
| 5,568,888 | A * | 10/1996 | Seber | B26B 3/06 |
| | | | | 224/232 |
| 8,033,791 | B1 | 10/2011 | Watanabe | |
| 8,595,931 | B2 * | 12/2013 | Riddell | F03D 1/0633 |
| | | | | 29/889.6 |
| 9,638,163 | B2 * | 5/2017 | Holloway | B66C 13/08 |
| 10,337,540 | B2 * | 7/2019 | Wardropper | F03D 80/50 |
| 11,867,156 | B2 * | 1/2024 | Herrig | F03D 80/50 |
| 12,098,698 | B2 * | 9/2024 | Danielsen | F03D 80/50 |
| 2007/0290426 | A1 * | 12/2007 | Trede | F03D 80/70 |
| | | | | 269/1 |
| 2010/0139062 | A1 | 6/2010 | Reed et al. | |
| 2012/0301293 | A1 * | 11/2012 | Bech | F03D 13/10 |
| | | | | 416/1 |
| 2015/0233341 | A1 * | 8/2015 | Neumann | B66C 1/66 |
| | | | | 414/800 |
| 2017/0002797 | A1 | 1/2017 | Chen et al. | |
| 2017/0370386 | A1 | 12/2017 | Wardropper et al. | |

FOREIGN PATENT DOCUMENTS

| | | | |
|---|---|---|---|
| EP | 3112667 | A1 | 1/2017 |
| WO | 2016107624 | A1 | 7/2016 |

OTHER PUBLICATIONS

International Searching Authority, International Search Report and Written Opinion issued in corresponding PCT Application No. PCT/DJ2022/050185, dated Nov. 25, 2022.

* cited by examiner

ANTI-OSCILLATION TOOL FOR WIND TURBINE BLADES

This invention relates to an anti-oscillation tool for wind turbine blades and to a method for securing wind turbine blades against oscillations.

During the construction of a wind farm the wind turbines in the farm are progressively installed, and there is typically a period of time where the turbines are assembled, but the turbines are not yet operational. In addition to construction of the turbines various other works are required including the construction and installation of the electrical systems and components required to connect to the grid, including internal park connections, substations and switches etc. Individual turbines will be erected and even if structurally complete will typically sit at standstill for a period before being fully commissioned and connected to the grid. During this period the rotor is locked and the blades are to as great an extent as possible positioned to minimise the forces experienced from the incident wind. However, the wind direction will inevitably change and without the possibility to adjust the yaw and/or pitch, the blades may be subject to incident wind which risks setting up unwanted vibrations.

The problem of such oscillations is caused by the largely unstable flow of air around the blade when the blade is pitched out of the wind. The air flows around the curved surface of the blade, but cannot stay attached to the blade surface in laminar flow because the blade is not pitched correctly to support lift. At high angles of attack stall is observed, with associated negative aerodynamic damping, resulting in instability of flow which can give rise to blade oscillations.

These oscillations are typically experienced first at the tip of the blade, where the reduced diameter and lighter frame offer less resistance to the rhythmic shifting force provided by the air. The worst case is when the incident wind meets the blade perpendicular to one of its flat surfaces and has to flow around the leading and trailing edge of the blade. In this situation the vortices can be shed in a manner which creates significant vibration, particularly if resonance phenomena are exhibited, and in rare situations even to the extent that blade damage can result.

Wind turbines are also necessarily at standstill during service or repair of the turbine or its blades, and during such periods of service the blades may also be susceptible to edgewise vibration.

The Applicant has previously disclosed in EP2507513 the use of a tool for fitting over blades at standstill in the form of a sleeve-like device formed of a net-like material having an open mesh. The mesh material of the sleeve is able to disrupt the smooth flow of air over the blade by forming a turbulence-inducing non-aerodynamic surface which thereby significantly reduces the instability associated with stall generation.

In order to provide improved aerodynamic properties, blades are commonly fitted with structures which change the airflow over the blade. For example, blades may be provided with serrated structures at the blade trailing edge which serve to reduce turbulence and hence reduce noise, and increase aerodynamic lift. These are typically formed of plastics strips which are mounted on or integrated into the blade at the blade trailing edge. These structures are relatively delicate, and can be damaged by the sleeve-like tools of the type discussed above, particularly during installation and removal of the tools. Moreover, the tools themselves can be damaged by the serrations, again particularly during installation or removal, or when fitted, especially during periods of high wind.

The present invention is a development of this tool which is effective at reducing such vibrations, whilst being easy to install and remove from a blade, and which minimises risk of damage to the blade and any aerodynamic-enhancing features provided on the blade or to the tool itself.

SUMMARY OF THE INVENTION

In a first aspect the invention resides in a device for fitting to wind turbine blades at turbine standstill in a non-operational state for example during turbine installation or service.

The device comprises an elongate flow-disrupting flexible sleeve for fitting over a blade tip and extending part-way along its length having a tip end which in use overlies a blade tip, an open end, and a first edge region which in use overlies a blade trailing edge, and an elongate guard provided on the sleeve at the first edge region of the sleeve configured to overlie or receive the blade trailing edge.

The guard provides a protective function for the trailing edge of the blade and in particular any aerodynamic-enhancing features provided on the blade such as serrations. The guard overlies the serrations or at least extremities thereof, forming a cover so that the serrations do not snag or otherwise interfere with the material of the flexible sleeve, either as the tool is being fitted onto or removed from the blade, or when left on the blade during turbine standstill as discussed above. In this manner the risk of damage to the tool and to the blade is reduced.

The guard is preferably formed of an elongate profile member of generally U-shaped section having opposed sides defining an opening therebetween into which a part of the blade trailing edge can be received. The expression "generally U-shaped" is to be interpreted broadly so as to include not only a precise U-shape but similar shapes such as a V-shape or J-shape or the like, or TT-shape or part-rectangular shape, with a concave profile into which the blade trailing edge serrations extend and are at least partly enclosed.

The guard is preferably formed of a semi-rigid material so that the guard can accommodate the non-linear shape of the blade trailing edge. For example, a synthetic plastics foam material can be utilised. The guard may be formed in one piece, or in a number of individual sections, to facilitate handling of the tool.

In one preferred form the material of the sleeve is secured to an interior surface of the guard, whereby a space is created within the edge region of sleeve, so that as the blade serrations extend into this space they are spaced from and do not interfere with the sleeve material.

In an alternative form the guard is located inside the sleeve at the trailing edge region thereof, ensuring separation of sleeve and blade serrations.

In another preferred form the material of the sleeve at the trailing edge terminates to define an opening to the interior of the guard, with the opposed edges of the sleeve joined to opposite sides of the guard. The opposed sleeve edges may be joined to outer faces of the guard sides, for maximum separation of the sleeve material. Alternatively, the opposed sleeve edges may be joined to the opposed sides of the guard at inner faces thereof. The material of the sleeve and guard may joined to each other by one or more of adhesive, staples, tape, welding or stitching or other similar techniques, or other fixings such as loops and eyes or the like.

The opposed sides of the guard at the lower edges may be shaped where they face each other to define a widened opening which tapers inwardly i.e. narrows towards the interior of the guard. This widened opening facilitates the guiding of the blade serrations into the guard, with the narrowed region locating and facilitating the retention of the guard on the serrations.

The guard may be provided with an insert or inserts of a relatively stiffer material, for example as strips on opposed sides of the opening of the guard, to further protect the guard from damage as the serrations are being guided into the guard. Alternatively, the inset may have a generally U-shaped form which conforms to the U-shaped guard, fitting inside this guard.

In one form the sleeve comprises a net-like material which creates a cover of high surface roughness as described in Applicant's EP2507513. The mesh of the net may be relatively open, for example from about 2 cm to 10 cm. The roughness disrupts the laminar flow of air over the blade, which decreases the tendency of vortex shedding from the trailing and leading edges of the blade.

In an alternative form the sleeve is formed of an elongate sock-like bag of fabric material or thin flexible sheet material such as a plastics material, where a plurality of flow-disrupting members protrude from and are secured to the bag.

The flow-disrupting members may be of elongate form. They are preferably arranged distributed spaced over the bag surface, such as in a generally random pattern which present members orientated at a multiplicity of orientations or angles relative to the blade axis, such that they form an effective barrier to disrupt airflow incident over a range of wind angles to the blade surface. It may be arranged that a majority of the flow-disrupting members extend generally at an angle of less than 45 degrees to the length of the bag, and hence in use when fitted on a blade, to the blade axis. In this way they serve as an effective barrier to disrupt airflow occurring across the blade generally in the chordwise direction, which is most likely to risk inducing vibrations.

Both surfaces of the bag are advantageously fitted with the flow-disrupting members, that is surfaces of the bag which overlie both windward and leeward blade surfaces. However, in some cases it may be possible to employ such flow-disrupting members on only one surface of the bag, for example where the risk of incident wind on one surface is remote.

The flow-obstructing members are preferably formed of a structure and/or material so as to be light, for example they may be hollow members or comprise foam blocks. In this way the total weight of the device can be minimised, for ease of handling. The members may be contained in pockets secured to the bag, or secured to the bag material in some other way such as by stitching or gluing.

In a further development the sleeve of the device may additionally be provided at the region which in use overlies the leading edge of the blade with an elongate cap which covers the blade leading edge. This may be formed with a generally U-shaped profile, which serves to facilitate correct positioning and retention of the sleeve on the blade. This may in similar manner to the guard be an extruded profile of a semi-rigid material.

It may be arranged that one or both of the guard and cap are provided with additional flow disrupting features in the form of upstands extending form the surface of the guard and/or cap.

Various control lines may be attached to the device. One or more tensioning lines are attached to the sleeve adjacent to its open end, to secure the sleeve on a blade. These extend from the sleeve and are attached in use to a point on the sleeve adjacent the hub, or to the hub itself. Further, one or more guide lines are attached to the device to allow its lowering from a blade after use. These may extend through a series of loops provided at the sleeve edge.

In a further aspect the invention resides in a method of operating a wind turbine to inhibit oscillations induced by the air flow across the blades when the wind turbine is a non-operational state using a device as described above, the method comprising: releasably locking the wind turbine rotor; for each rotor blade pulling a device over the blade so that the guard of the device overlies the blade trailing edge, securing the device and retaining it in position whilst the turbine is in a non-operational state, so that the device covers a region of the blade surface and provides a non-aerody-namic outer surface for inducing turbulence in the air flow across the blade.

Where the device has a guard of generally U-shaped section the method further involves arranging the device so that blade serrations at the blade trailing edge are received between opposite sides of the guard.

BRIEF DESCRIPTION OF THE DRAWINGS

Embodiments of the invention will now be described in more detail, and by way of example, with reference to the drawings, in which.

DETAILED DESCRIPTION OF THE PREFERRED EMBODIMENTS

Figure 1:
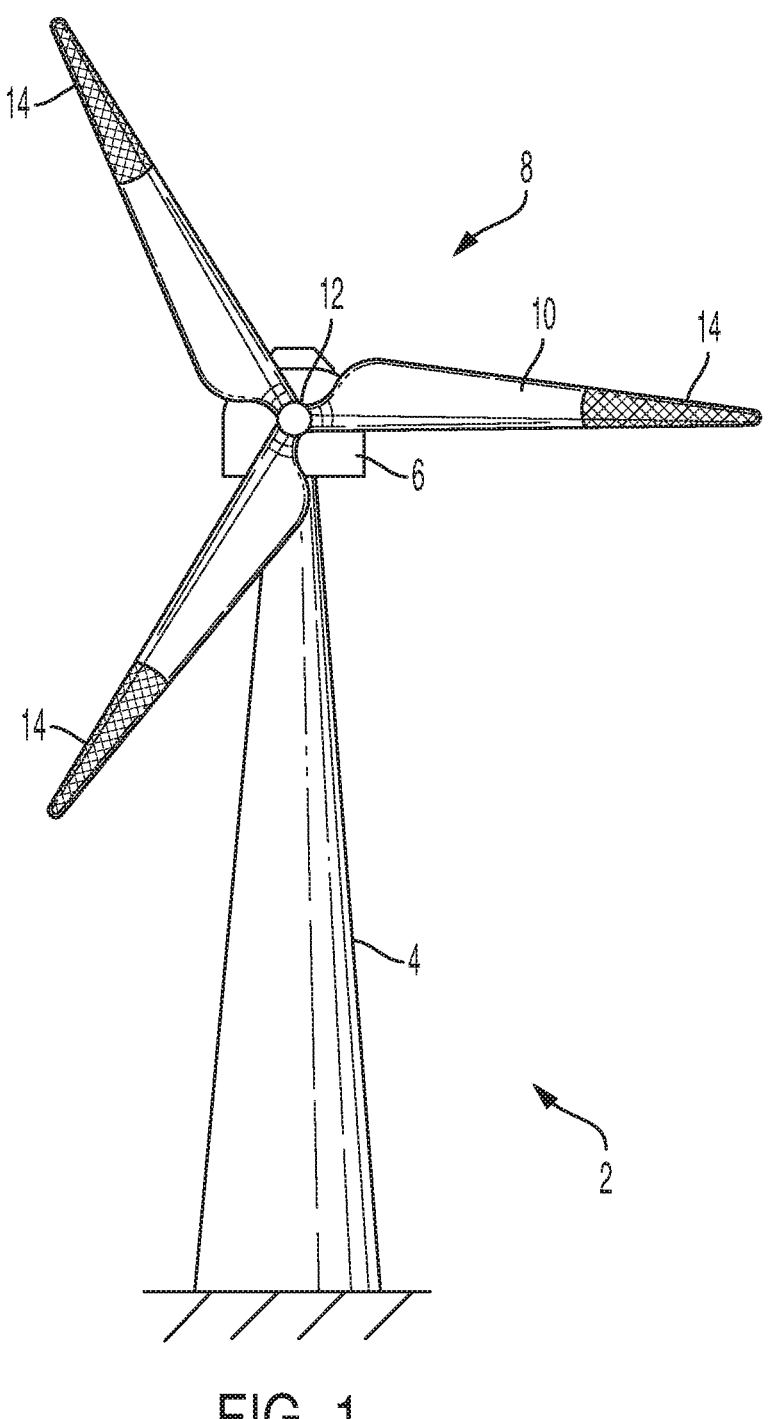
FIG. 1 is a schematic illustration of a wind turbine, including an anti-oscillation tool fitted to the wind turbine blades.

A typical horizontal axis wind turbine is illustrated in FIG. 1 to which reference should now be made. FIG. 1 illustrates a wind turbine 2, comprising a wind turbine tower 4 on which a wind turbine nacelle 6 is mounted. A wind turbine rotor 8 comprising a number of wind turbine blades 10 (usually three, sometimes two) is mounted on a rotor hub 12.

The hub 12 is supported on a shaft (not shown) extending from the nacelle front. The nacelle and rotor can be turned about a vertical axis, using a yaw drive positioned at the top of the tower 4, to change the direction in which the turbine faces. The blades 10 are aerodynamically profiled so that they experience a 'lift' or pressure from the wind as the wind flows over the surface of the blade. The angle or pitch at which the leading surface of the blade aerodynamic profile meets the incident wind can in operation be altered using a pitch drive that rotates the blades 10 with respect to the hub 12.

In normal power generation, the yaw drive turns the nacelle 6 so that the rotor 8 of the wind turbine is pointed into the wind. The pitch of the blades 10 can then be adjusted so that the force they experience from the wind is maintained within safe operating parameters, while generating as much energy from the incident wind as possible.

As discussed above, there are situations in which a wind turbine is at standstill in a non-operational state, and is unable to respond to changes in wind direction. During construction of a wind farm as turbines are progressively erected they are necessarily at standstill with the rotors locked and unable to operate for a period, until connection to the grid and full commissioning can occur. In the case of large wind farms with many turbines this period can be several months. Moreover, during subsequent service or repair of the turbine or its blades, the rotor can be at standstill for a period of time, with the rotor locked and unable to be adjusted in response to wind direction changes. As noted, it is during such periods of rotor standstill without ability to yaw the turbine and/or to pitch the blades that the blades can occasionally be susceptible to edgewise vibration.

FIG. 1 shows schematically the location of an anti-oscillation tool 14 fitted to each of the blades 10 at the blade tip region and extending part way along the blade. The tool serves to alter the aerodynamic properties of the blades to reduce risk of such vibrations.

Figure 2:
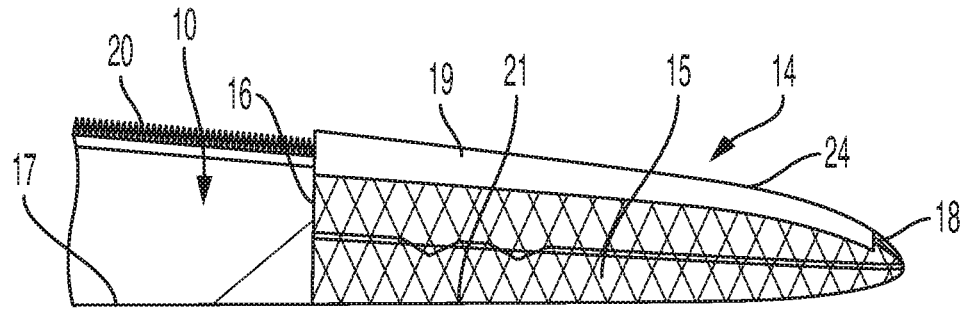
FIG. 2 is a schematic side view of a first embodiment of an anti-oscillation tool fitted to a wind turbine blade.

FIG. 2 shows an anti-oscillation tool 14 in accordance with a first embodiment of the invention which is an elongate generally sock-like flexible sleeve 15 that is fitted over the tip of a wind turbine blade 10 when the rotor is locked and at standstill. The sleeve 15 has an open end 16 which is manoeuvred over the blade tip on installation of the tool and which in use lies closer to the blade root, and a closed or substantially closed end 18 which in use overlies the blade tip. As noted above, the tip region of the blade is the region most susceptible to oscillation, and as such the tool 14 is dimensioned to extend at least over the blade tip region and extend along the blade length by several metres from the tip. For a typical blade of say 50-80 m in length, the length of the tool 14 can be anywhere in the range of a few meters to a few tens of meters. For a blade of about 50-80 m it is found that a length of about 10 m is preferred; whilst the technical benefit increases with a longer tool the additional benefit is limited and must be weighed against the practical considerations of handling a larger and heavier tool.

As can be seen in FIG. 2 the blade here is provided with aerodynamics-enhancing features in the form of trailing edge serrations 20, and the sleeve 15 fits over these features also. However, the tool can equally be employed in connection with blades which do not have such features. The plan form of the sleeve 15 matches at least approximately the form of the blade region to which it is to be fitted so that it is a reasonably snug fit, and is therefore relatively wide in the chordwise direction at the open end 16 and tapers towards the tip 18. Moreover, to conform to the thickness of the blade the sleeve needs to accommodate only the relatively thin blade region at its tip 18, but broadens towards its open end 16 closer to the blade root. The tool 14 has a trailing edge region 19 which in use overlies the blade trailing edge, and a leading edge region 21 which overlies the blade leading edge.

The sleeve 15 is formed of a net-like material comprising a large number of intersecting or overlapping individual cords 22, where the cords may themselves comprise individual fibres or twisted strands. The cords are arranged to form a relatively open mesh. For example, as illustrated schematically in FIG. 2, the cords comprise elements which extend longitudinally (that is in the longitudinal or flap direction of the blade when fitted thereon) intersected by cords which extend cross-wise, here in two intersecting inclined directions. In reality, a larger number of chords will form the net than are illustrated. It will further be appreciated however that a variety of other patterns of fibres or strands can be utilised in the constitution of the net.

The individual cords of the net may have a diameter of from 1-2 mm up to 20 mm diameter, most preferably about 4 mm. The weave or mesh size of the net may have a wide range, for example from 10 mm to 100 mm. The fibres of the cord may be natural fibres such as hemp, sisal, jute or cotton, or synthetic fibres such as nylon, polyamide, polypropylene, polyethylene, or any suitable thermoplastic fibrous material The net-like material with multiple cords crossing the blade in different directions serves to present a coarse surface which disrupts the smooth flow of air over the blade surface, creating turbulence and thereby reducing vortex shedding from the blade edges, as is discussed further below.

Figure 3:
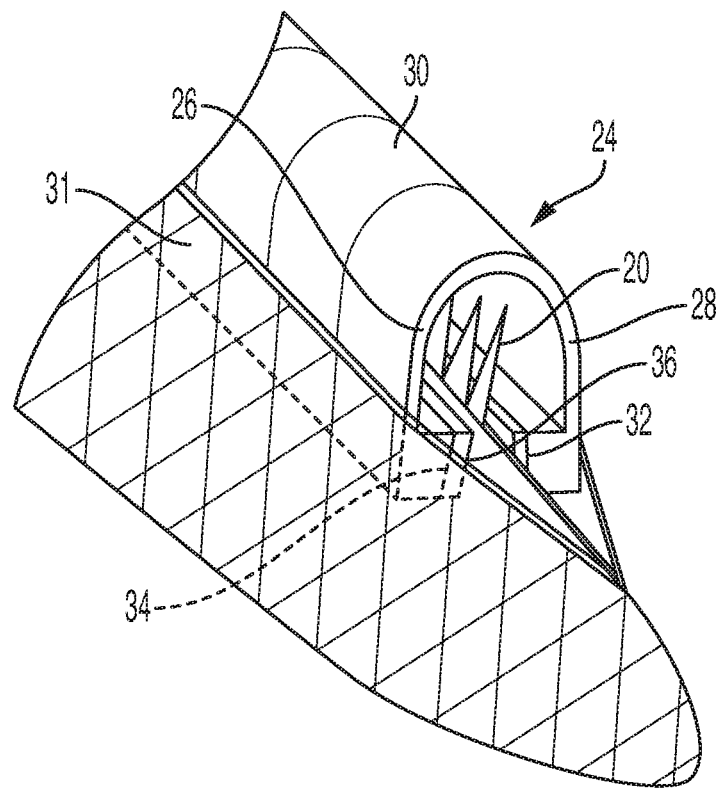
FIG. 3 is a detail of an end region of the tool of FIG. 2.

As can be seen in FIG. 3, at the trailing edge 19 of the sleeve the sleeve is provided with a guard 24. This guard 24 is formed of a body of semi-rigid material in the form of a profile of generally U-shaped section having opposed sides 26, 28 which join at a base region 30 of the U shape. The guard 24 overlies the trailing edge of the blade and forms a cover or enclosure which receives the blade trailing edge and serrations 20 thereon, or at least parts of such serrations 20. The expression "generally U-shaped" is to be interpreted broadly so as to include not only a precise U-shape but similar shapes such as a V-shape or J-shape, IT or part-rectangular shape or the like with a concave profile into which the blade trailing edge serrations extend and are at least partly enclosed.

The guard preferably has a rigid or semi-rigid form whereby the blade serrations can be reliably received and enclosed. In a preferred form the guard is formed of a synthetic plastics foam material such as polyethylene which has a relatively soft surface but in profile form is able to maintain sufficient rigidity to reliably receive the serrations as the tool is fitted, whilst adapting to the non-linear shape of the blade trailing edge. An example of a suitable material is a polyethylene foam which be cross-linked or not, having a volumetric density of about 30 kg per cubic metre.

The guard will typically have a dimension of about 10-20 cm in height in order to accommodate typical-sized serrations, for example about 15 cm, and about 10 cm in lateral width, but can be varied to according to serration dimension and material considerations.

At the trailing edge region 19 of the sleeve where the guard 24 is provided the net material is interrupted, such that an opening is defined between opposed edges of net material, and the opposed edges are instead joined to the guard 24. There is then an opening therebetween through which the serrations 20 extend, extending into the guard 24 between the opposed sides 26, 28 of the guard. As shown in FIG. 3 the opposed edges of the net overlie and are joined to the outermost faces of the sides 26,28 of the guard 24 at a region indicated 31 whereby in essence the guard 24 extends part-way into the net material. The lateral width of the guard 24 is then serving to separate the edges of the net material, which facilitates entry of the serrations 20. The manner of joining net material to guard 24 will depend in part on the material and structure of the net and material of the guard. Examples of fastening techniques include adhesives, taping, stitching, stapling or welding. In one preferred technique where the net is formed of a synthetic plastics mesh and the guard of a synthetic plastic foam material the edge of the net is formed with a seam which is fixed to the guard using an adhesive.

In a further alternative not illustrated the edges of the net may instead be fixed to the lowermost ends of the opposed sides of the guard which are distant from the base 30 of the U-shaped profile.

As illustrated, the guard 24 is formed of a single component, such as a single profile, which for ease of manufacture would be typically be an extruded profile. In this case the material of the guard would preferably be relatively soft so that the tool can be easily rolled or folded when not in use, for transport and storage.

It may also be arranged that the guard 24 is formed of multiple shorter sections, for example of 1-2 m length, in which case more rigidity of guard material can be tolerated. The provision of such sections serve to facilitate the manipulation of the tool when not fitted on the blade, for example the tool may then be more easily folded at the positions of the breaks between sections, for easier transport and storage. Such shorter sections may equally be extruded profile sections.

Further, as shown in FIG. 3 the opposed sides 26,28 of the guard are provided at the lower opening of the U-shape which receives the blade serrations with laterally inwardly protruding regions 32 having slightly inclined surfaces 34 which narrow towards the base 30 of the profile. In this manner the serrations 20 can be easily located in the widened opening of the guard 24, and as the serrations 20 are inserted the opposed protruding regions 32 can form a relatively close fit on the serrations. This close fit assists to keep the guard 24 located in place on the blade trailing edge. Thus, the guard 24 serves to receive the serrations as the sleeve is installed, ensuring that the serrations and material of the net do not interfere with each other either during installation and removal, or during the period where the tool remains installed on the blade, thereby avoiding damage to the serrations 20 or to the tool.

An interior of the guard 24 may be provided with an insert or inserts 36 of a relatively stiffer material, in particular at the opening of the guard on the inclined surfaces 34 there are provided strips which extend the length of the guard. These function to further protect the guard from damage as the serrations are being guided into the guard and to provide the guard with an additional degree of rigidity. An appropriate material could be a high-density polyethylene, having a density of the order of 100-200 kg per cubic metre, but many other plastics materials could be used, nylon, PVC etc. Alternatively, a cellular rubber material could be utilised at density of about 300 Kg per cubic metre, or sponge rubber of density approximately 600-900 Kg per cubic metre.

Where the guard is formed of a plurality of sections, the inserts 36 will likewise be formed in corresponding sections.

Figure 4:
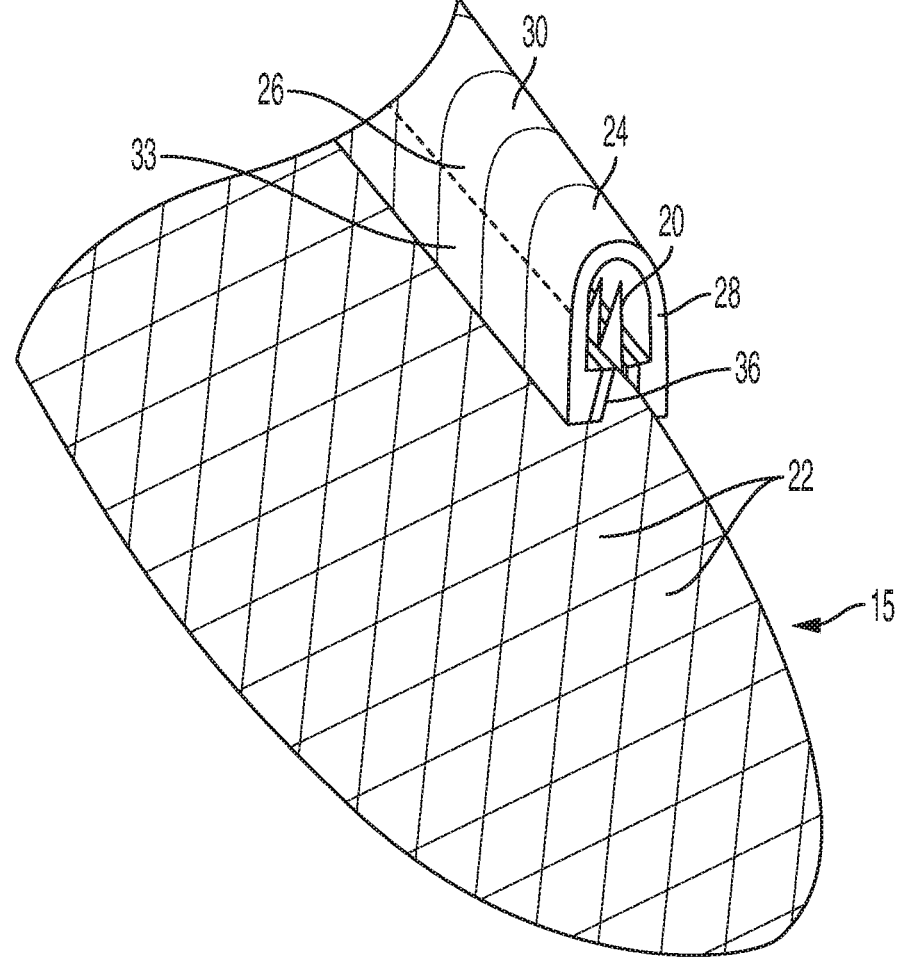
FIG. 4 is a view of an end region of the tool according to a second embodiment.

Other arrangements of interface between net and guard can be utilised. As shown in a second embodiment illustrated in FIG. 4 the edges of the net 15 may be fixed to the inner faces of the opposed sides 26, 28 of the guard at a position indicated 33. Again, such fixing may be by adhesive, taping, stitching, stapling or welding.

Figure 5:
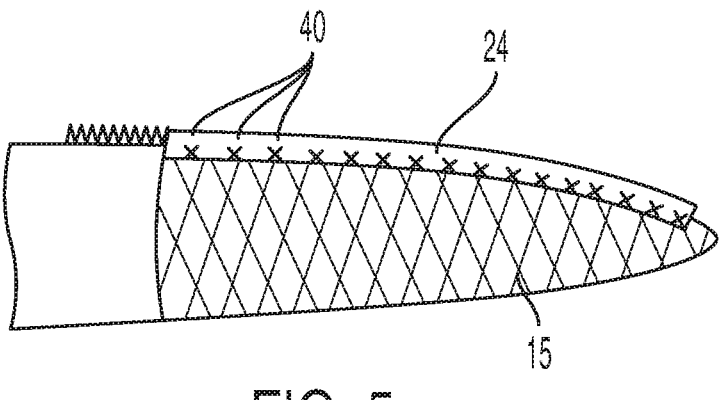
FIG. 5 shows the tool of a third embodiment of the invention employing stitching to secure the sleeve on the guard.
Figure 6:
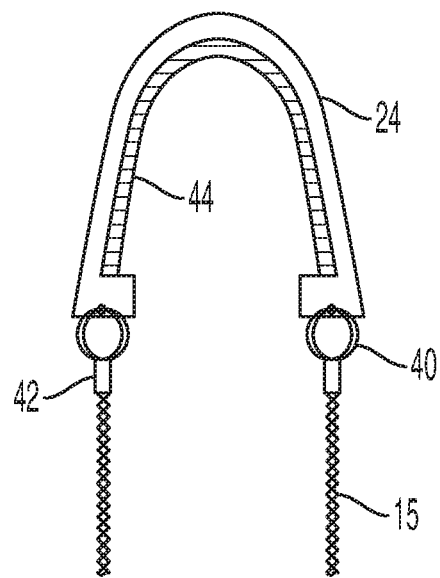
FIG. 6 is a schematic cross-sectional view of the tool of FIG. 5.

FIG. 5 shows a third embodiment in which the edges of the net material are stitched to the guard, with positions of stitching 40 indicated schematically. The edge of the net material may have a seam 42 with the stitching into the seam. Alternatively, the stitching may be directly into the cords making up the net material. FIG. 6 shows a cross-section of the guard 24 and edge region of the net 15 indicating the stitching 40. Also shown in FIG. 6 is a stiffener 44 which is of U-shaped form which is dimensioned to fit inside the guard 42, closely underlying the guard. The stiffener 44 is likewise formed of a material which is semi-rigid but of stiffer material than the guard 24. As well as giving the guard increased stiffness, serving to ensure the guard is retained more firmly on the blade during use, the stiffener 44 can also provide a protective function for the inside of the guard so that the blade serrations do not damage the guard interior.

Figure 7:
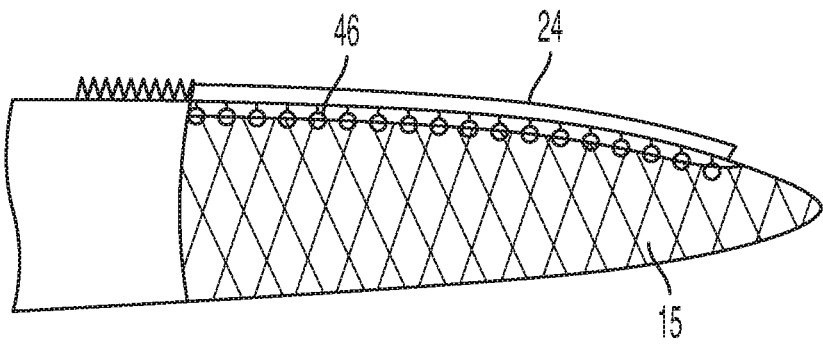
FIG. 7 shows the tool of a fourth embodiment of the invention employing eyelets to secure sleeve and guard.
Figure 8:
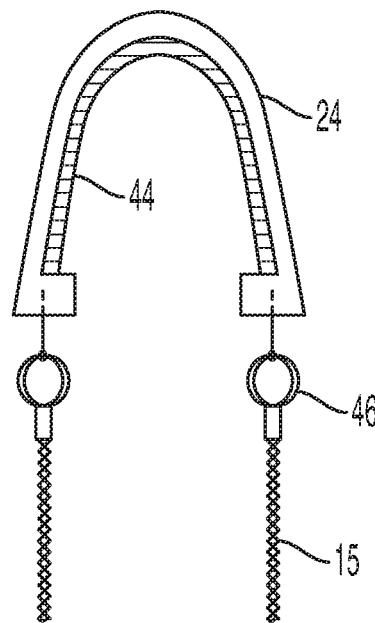
FIG. 8 is a schematic cross-sectional view of the tool of FIG. 7.

FIGS. 7 and 8 show a fourth embodiment in which the sleeve is joined to the guard by means of rings 46. These are held at the lower edges of the guard 24 by stitching or other fixing extending through the guard edge. The rings 46 may be secured into eyelets in a seam of the net, or directly into the cords making up the net.

Figure 9:
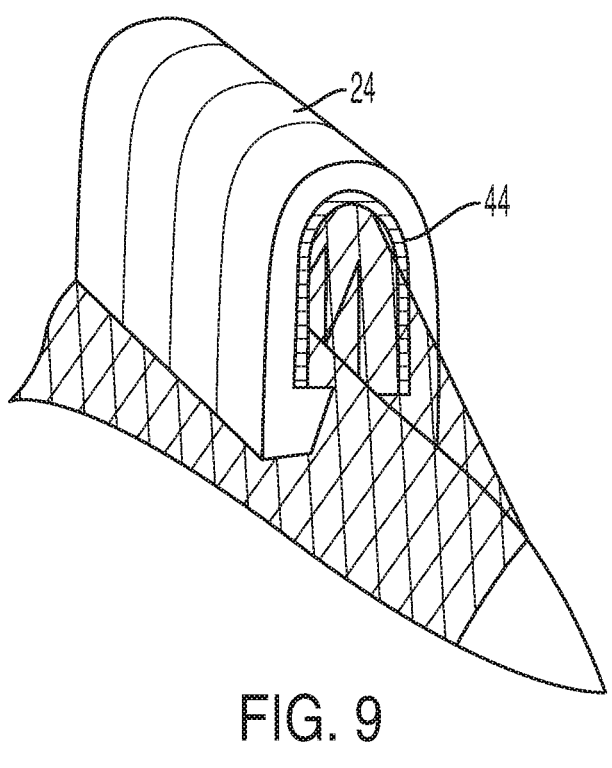
FIG. 9 shows an end region of a tool according to a fifth embodiment of the invention where the guard overlies the sleeve.
Figure 10:
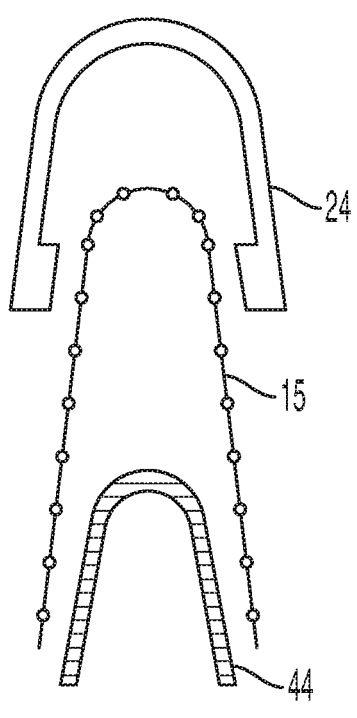
FIG. 10 is a schematic exploded view of the tool of FIG. 9.

In a fifth embodiment of the invention as illustrated in FIGS. 9 and 10 the net material 15 of the sleeve is not provided with any opening at the trailing edge region but rather is uninterrupted by any such opening and secured to the interior surface of the guard over substantially the entire inner U-shaped surface of the guard, whereby a space is created within the sleeve into which the blade serrations 20 can extend without interfering with the material of the sleeve. Again, the net material 15 can be secured by adhesive, or by a variety of other techniques such as taping, stitching, stapling or welding. As with the embodiments of FIGS. 5 to 8 the stiffener 44 has a generally U-shaped profile which conforms to and fits inside the guard 24. As shown in FIG. 10 which is a schematic sectional exploded view, the stiffener 44 is dimensioned to fit within the guard 24 with the trailing edge of the net sandwiched between guard 24 and stiffener 44. The stiffener 44 may be secured inside the guard 24 by adhesive, or taping, stitching, stapling or welding.

Figure 11:
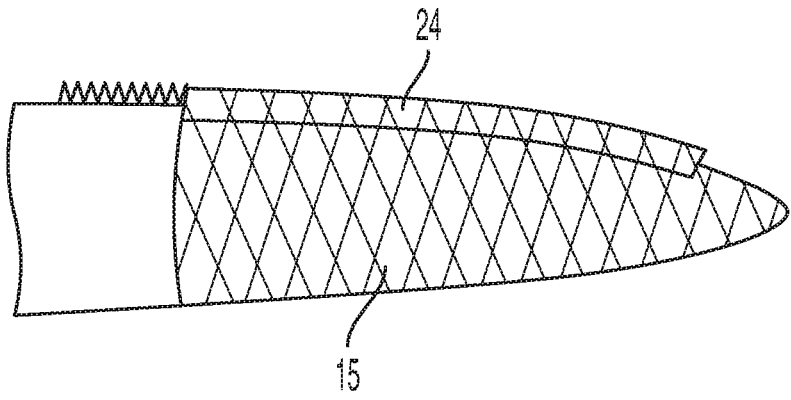
FIG. 11 shows a tool according to a sixth embodiment of the invention where the sleeve overlies the guard.
Figure 12:
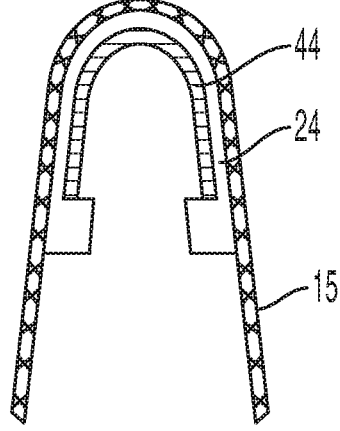
FIG. 12 is a cross-sectional view of the tool of FIG. 11.

In a sixth embodiment illustrated in FIGS. 11 and 12 the trailing edge of the sleeve overlies the guard 24. The guard and net are again connected by suitable mean such as adhesive, taping, stitching, stapling or welding. As can be seen in FIG. 12 which is a schematic sectional view a stiffening insert 44 is fitted within the guard and may be joined thereto also by adhesive, taping, stitching, stapling or welding. It may also be held without any such means but instead by mechanical fixing such as locating lugs or studs.

Figure 13:
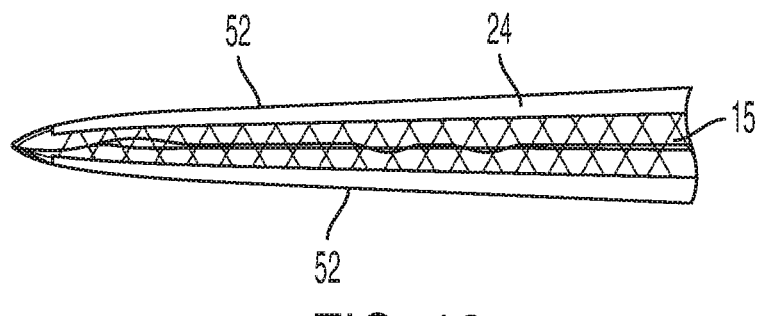
FIG. 13 is a view of a tool according to a seventh embodiment of the invention employing a leading edge cap.
Figure 14:
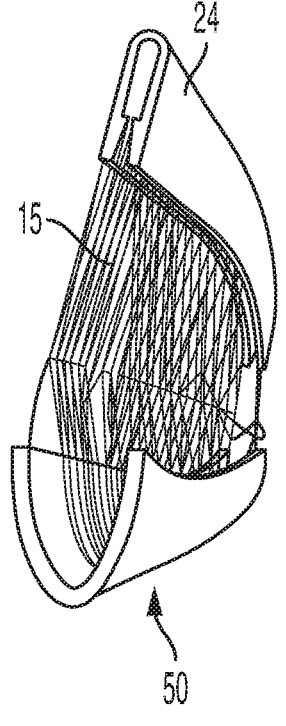
FIG. 14 is an end view of the tool of FIG. 13.
Figure 15:
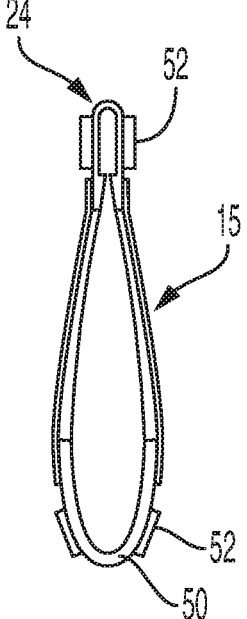
FIG. 15 is a cross-sectional view of the tool of FIGS. 13 and 14.

A seventh embodiment of anti-oscillation tool is illustrated in FIGS. 13 to 15. This has identical construction to the first embodiment (FIG. 3) with respect to provision of a net-like sleeve 15 with trailing edge guard 24, and like reference numerals are used to indicate like parts. It differs in construction at the leading edge of the tool. Here the tool is provided with an additional member which engages over the leading edge of the blade. More particularly, there is provided an elongate cap 50 of generally U-shaped section which extends the length of the tool, and is shaped to conform to the shape of the blade leading edge. The lateral dimension of the cap conforms to the blade dimension and therefore decreases laterally towards the tip. The cap 50 is, in like manner to the trailing edge guard 24, preferably formed of a semi-rigid material. The net material at both sides of the sleeve 15 overlies the cap 50 and is secured at the outer faces thereof as best seen in the FIGS. 14 and 15. Again, such attachment can be by a variety of means such as adhesive, taping, stitching, stapling, riveting or welding.

The cap serves to facilitate mounting and de-mounting of the tool on the blade by holding the leading edge of the tool in the correct position, which assists in guiding the tool over the blade. It also assists in good retention of the tool when in use.

In this embodiment one or both of the cap 50 and guard 24 is/are provided with additional airflow-disrupting features. A can be seen in FIG. 15 the cap 50 and guard 24 are provided with flow-disrupting elements in the form of upstanding members 52. These are of generally elongate form of greater length than their width or height. Preferably, they upstand from the surface of the cap and/or guard by several centimetres, for example between 2 and 10 cm, or more preferably about 3 to 5 cm. These members 52 are arranged so that they form additional turbulence-inducing barriers to airflow extending generally chordwise across the blade which could otherwise create a degree of aerodynamic lift and risk of undesirable oscillations. Since in practice the airflow which might cause undesirable oscillations may arise at a variety of angles relative to the strict chordwise direction, the members 52 are arranged so that the lengths of different members extend at a variety or multiplicity of different angles relative to the tool (and hence blade) axis. It is preferred that at least the majority of the members 52 extend at an angle of less than about 45 degrees to the blade axis, but otherwise exhibit a generally random pattern of orientation, so as to present some significant length generally perpendicular and therefore obstructive to chordwise airflow.

Both outer surfaces of the cap 50 and guard 24 (that is surfaces overlying both windward and leeward blade surfaces) are advantageously fitted with the flow-disrupting members. However, it may be arranged that such flow-disrupting members are provided on cap 50 and guard 24 at only one face of the tool, for example where the risk of potentially-damaging incident wind on one blade surface is less. These flow-disrupting members 52 may be secured to the cap and/or guard by a variety of means, such as adhesive or the like. Alternatively, they may be formed unitarily with the material of the cap and/or guard.

The combination of coarse flow-disrupting net material extending over the blade faces and the additional flow-disrupting members 52 on cap and guard at blade trailing and leading edges provides an especially effective tool for mitigating the risk of vortex-induced vibrations.

Figure 16:
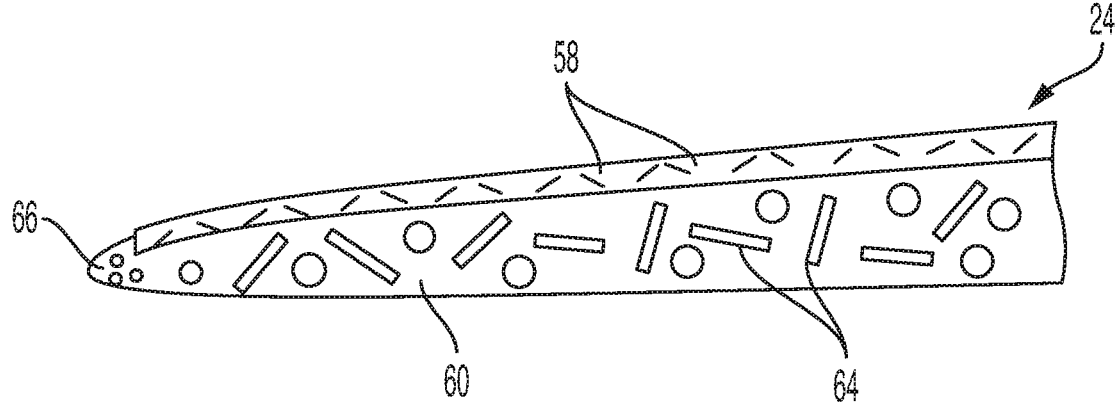
FIG. 16 shows a tool according to an eighth embodiment of the invention.

A still further embodiment of the invention is described with respect FIG. 16. In this version the tool has a sleeve 60 formed of an elongate sock-like bag of textile fabric material or thin flexible sheet material such as a plastics material. The tool is further provided with a trailing edge guard 24 having the structure of any one of the earlier-described embodiments. The bag making up the sleeve 60 is shaped and dimensioned to make a close fit over the blade tip region, likewise extending several metres or tens of metres along the blade length.

The material making up the bag may be a woven synthetic plastics material. Ideally, the material is at least breathable and preferably able to allow water to pass through to a degree to prevent trapping water therein. Particularly suitable materials include nylon, PVC, polyester, polyurethane, polyethylene or polypropylene. Other material such as cotton canvas might also be used. Alternatively to a woven material, the material of the bag may be a thin plastics sheet material. The weight of the material is selected so that the bag is able to withstand being subjected to high winds without tearing. Such materials may be coated to reduce friction with the blade to further facilitate fitting on and removal, for example with silicone or Teflon on other low friction material. Oils may also be employed for this purpose. Appropriate selection of material can also further facilitate bag removal in adverse weather conditions such as when the bag is wet or even frozen.

The bag is provided with a number of flow-disrupting members 64 protruding from and secured to the bag. The flow-disrupting members 64 are of generally elongate form of greater length than their width or height. The members 64 upstand from the bag by at least several centimetres, for example between 2 and 10 cm, or more preferably about 3 to 5 cm. The members 64 are arranged so that they form turbulence-inducing barriers to airflow extending generally chordwise across the blade which could otherwise create a degree of aerodynamic lift and risk of undesirable oscillations. Since in practice the airflow which might cause undesirable oscillations may arise at a variety of angles relative to the strict chordwise direction, the members 64 are arranged so that the lengths of different members extend at a variety or multiplicity of different angles relative to the bag (and hence blade) axis. It is preferred that at least the majority of the members 64 extend at an angle of less than about 45 degrees to the blade axis, but otherwise exhibit a generally random pattern of orientation, so as to present significant length generally perpendicular and therefore obstructive to chordwise airflow. Both surfaces of the bag are advantageously fitted with the flow-disrupting members 64, that is surfaces of the bag which overlie both windward and leeward blade surfaces. However, in some cases it may be possible to employ such flow-disrupting members 64 on only one surface of the bag, for example where the risk of potentially-damaging incident wind on one surface is less.

The individual flow-disrupting members 64 may have a variety of lengths for example from 0.5 to 1.5 m, more preferably about 0.7 m.

The flow-obstructing members 64 comprise bodies of a relatively light material and/or construction so as to protrude from the surface of the bag without adding too significant weight to the tool. In one preferred form these bodies comprise plastics foam blocks which are constrained in pockets of material joined by stitching or other means to the material of the bag. The blocks here have a square or rectangular section but may have a variety of other forms, for example circular or polyhedral. As an alternative to plastics or foam, sections of hollow plastics materials may be used, for example extrusions of square or rectangular section. It will however be appreciated that a wide variety of other materials (e.g. other plastics materials, balsa wood) or structures may be employed to provide the upstanding bodies, subject to the requirement that they should be relatively rigid and light.

The illustrated bodies 64 are straight sections for ease of fabrication, but this is not essential and a variety of other shapes may be employed, for example zig-zags, curved shapes, or 'S' shapes, provided that the bodies have regions which form obstructions to generally chordwise airflow. A curved design is able to present a plurality of different angles to the chordwise direction in the one body.

The guard 24 has identical construction to any one of the earlier described embodiments, being of elongate generally U-shaped section with opposed sides which overlie the blade trailing edge and receive at least the extremities of blade serrations therebetween. In similar manner to the net material of the first embodiment the material of the bag at the trailing edge may be interrupted, defining, with the free edges of bag material joined to the opposed sides of the guard 24, preferably on the outer faces of the sides thereof. An opening from the bag into the interior of the guard is thereby formed, through which in use the blade serrations extend.

The guard 24 may also be provided with flow-disrupting features indicated 68 in similar manner to the embodiment of FIGS. 13 to 15.

The tip extremity of the bag is formed with a number of openings 66 which serve as drain holes, to prevent water collecting therein. Alternatively, the tip extremity of the bag may be open so that the extremity of the blade tip protrudes from the open tip of the bag, again to prevent water collecting.

The tool of the preceding embodiments, once in place on wind turbine blades 10, limits vortex shedding induced oscillation of the wind turbine blade, by deliberately causing turbulent air flow and randomising the attachment/vortex shedding effect, reducing the oscillations and the possibility of blade damage.

When employed during turbine erection, the tool is typically fitted on the blade in the field before the blade 10 is lifted and installed on the turbine hub 12. Alternatively, the blade 10 can be installed on the hub 12, and the tool 14 later fitted. Further alternatively, the tool 14 may be fitted to the blade 10 at the blade factory or other location prior to its transport to the wind farm site. When used during a blade or turbine service operation the tool 14 can be fitted to the already-installed blade 10, preferably whilst the blade is in the downward-pointing six o'clock position, for example by service personnel using rope access or drone access.

The tool is provided with structures for securing it on a blade. The sleeve is provided at or near its open end with tensioning points in the form of eyes or loops to which tensioning lines (one of which is indicated 17 in FIG. 2) can be attached, preferably at least one eye or loop on each side of the sleeve, and one tensioning line for each side of the sleeve. In use the tensioning line or lines 17 extend from the loop(s) to a fixing point on the blade at or near the blade root. The tensioning line 17 comprises a first length of inextensible line e.g. of 10 mm diameter extending the major part of the blade length joined to a short length of elastic line, which in turn is joined to a short length of webbing material which is extending from a tensioning ratchet arrangement secured on the blade root. By these means the tensioning line or lines 17 can be tightened and secured by hand by personnel fitting the bag using the ratchet, the length of elastic line maintaining a high degree of tension so that the tool is securely held on the blade and should not become detached even in high winds.

A lowering line (not shown) typically a thin line, for example 4 mm diameter is connected to the first length of the tensioning line when it is desired to lower the tool to the ground. This lowering line may remain connected to the first length when the tool is being employed on the blade, being wound up in the hub, so that when it is desired to lower the tool to the ground the service personnel need only release the webbing and ratchet, and play out the lowering line.

A guide line is also provided by which the tool can be guided when lowered to the ground after use of the tool. This line extends from a fixing point at the tip of the bag and along an edge of the bag where it extends through a series of loops at the bag edge. During use of the tool the guide line end at the blade root is tied off to a fixing point, for example it may be tied off with one or more knots to a part of the ratchet. The guide line passes through a second hole in the blade collar, also with a protection sleeve. When it is desired to release the tool from the blade the knots are released from the fixing point by the service personnel and the line thrown down to service personnel at the ground, where it facilitates guiding of the tool off the blade tip. By maintaining a degree of tension in the guide line as the lowering line is played out to lower the tool, the release of the tool can be carried out in a controlled manner. This is particularly important for blades which are provided with serrations, ensuring minimal risk of damage. The guide line also allows that if the tool gets stuck on the blade it can be pulled a little to help its release from the blade.

The invention claimed is:

1. A device for fitting to a wind turbine blade during turbine standstill to reduce risk of blade oscillation comprising:
   an elongate flow-disrupting flexible sleeve for fitting over a blade tip and extending part-way along a length of the blade, the sleeve having a tip end which in use overlies the blade tip, and an open end, and a first edge region which in use overlies a blade trailing edge, and
   an elongate guard provided on the sleeve at the first edge region of the sleeve configured to overlie or receive the blade trailing edge,
   wherein the elongate guard is of generally U-shaped section having a pair of sides with an opening therebetween into which a part of the blade trailing edge is to be received, wherein the pair of sides have lower edges which receive the blade trailing edge, and wherein the lower edges are formed with inwardly protruding regions.

2. The device according to claim 1 wherein the guard is formed of a semi-rigid material.

3. The device according to claim 1 wherein the material of the sleeve is secured to an interior surface of the guard, whereby a space is created within the first edge region of the sleeve.

4. The device according to claim 1 wherein a material of the sleeve at the trailing edge defines an opening to an interior of the guard, with opposed edges of the sleeve at the opening joined to opposite sides of the guard.

5. The device according to claim 4 wherein the opposed edges of the sleeve at the opening therein at the trailing edge are joined to the guard at outer faces of the sides of the guard.

6. The device according to claim 1 wherein the guard is located inside the sleeve at the trailing edge region thereof.

7. The device according to claim 1 wherein the lower edges of the guard which receives the blade trailing edge are formed with a widened opening which tapers inwardly towards an interior of the guard.

8. The device according to claim 7 wherein tapered regions are formed in the inwardly protruding regions.

9. The device according to claim 1 wherein the material of the sleeve and guard are joined by one or more of adhesive, staples, tape, welding, or stitching.

10. The device according to claim 1 wherein the guard is formed of a plastics foam material.

11. The device according to claim 1 wherein the guard is formed of a plurality sections.

12. The device according to claim 1 wherein the guard is provided with an insert of a material that is relatively stiffer than the guard.

13. The device according to claim 12 wherein the insert has a generally U-shaped form conforming to an interior of the guard which is located within the guard.

14. The device according to claim 3 wherein an insert is provided of generally U-shaped form conforming to the interior of the guard and located therein, wherein the trailing edge of the sleeve is held between the guard and the insert.

15. The device according to claim 1 wherein the flexible sleeve is formed of a material which provides a high surface roughness when fitted on a blade.

16. The device according to claim 15 wherein the flexible sleeve is formed of a net-like material.

17. The device according to claim 1 wherein the flexible sleeve is formed of a bag of fabric material or thin flexible sheet with a plurality of flow-disrupting members protruding from and secured to the bag, distributed spaced over the bag.

18. The device according to claim 17 wherein the flow-disrupting members are of elongate form and are arranged randomly over one or both surfaces of the bag.

19. The device according to claim 17 wherein a majority of the flow-disrupting members are arranged so that the lengths of the members are arranged at less than 45 degrees to the length of the bag.

20. The device according to claim 17 wherein the flow-disrupting members extend from the bag surface by between 2 and 10 cm.

21. The device according to claim 17 wherein the flow-disrupting members are hollow members or comprise foam blocks.

22. The device according to claim 17 wherein the flow-disrupting members are contained in pockets joined to sleeve.

23. The according to claim 1 wherein the sleeve is provided with an elongate cap which in use fits over a leading edge of the blade.

24. The device according to claim 23 wherein the cap is formed of a U-shaped profile.

25. The device according to claim 23 wherein the cap is formed of a semi-rigid material.

26. The device according to claim 23 wherein the guard and/or cap are provided with additional flow disrupting features upstanding from the cap and/or guard.

27. The device according to claim 1 wherein one or more tensioning lines are attached to the sleeve adjacent the open end of the sleeve to secure the sleeve on a blade.

28. The device according to claim 1 wherein one or more guide lines are attached to the sleeve to guide its lowering from a blade.

29. A wind turbine blade having a device according to claim 1 fitted thereon.

30. A wind turbine having one or more wind turbine blades, at least one blade having fitted thereon the device according to claim 1.

31. A method of operating a wind turbine to inhibit oscillations induced by the air flow across the blades when the wind turbine is a non-operational state using the device of claim 1, the method comprising: releasably locking the wind turbine rotor; for each rotor blade pulling a device over the blade so that the guard of the device overlies the blade trailing edge, securing the device and retaining it in position whilst the turbine is in a non-operational state, so that the device covers a region of the blade surface and provides a non-aerodynamic outer surface for inducing turbulence in the air flow across the blade.

32. The method according to claim 31 wherein the device has a guard of generally U-shaped section with opposed sides, the method further comprising arranging the device so that blade serrations at the blade trailing edge are received between opposite sides of the guard.

* * * * *